Patented Feb. 20, 1951

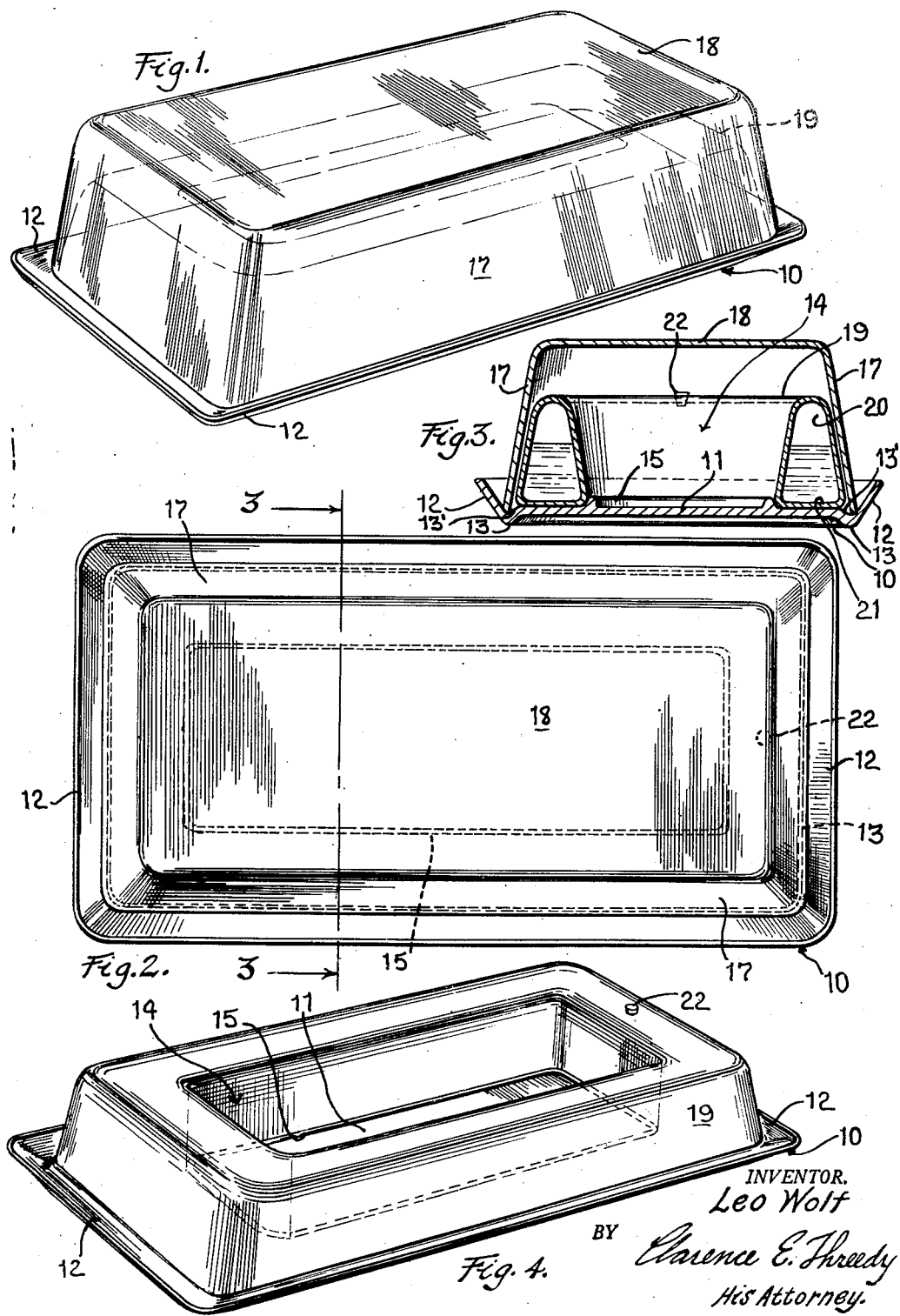

2,542,173

UNITED STATES PATENT OFFICE 2,542,173

PORTABLE RECEPTACLE

Leo Wolf, Chicago, Ill.

Application August 9, 1948, Serial No. 43,167

1 Claim. (Cl. 220—9)

This invention relates to certain new and useful improvements in portable receptacle for table use, in which there is provided an arrangement to preserve in solidified form for a period of time food contained therein or to maintain such food cool for a period of time where the food is in liquid form.

An object of the invention is to provide such a receptacle which comprises relatively few parts, one which may be easily cleaned and manufactured at an economical cost.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my invention in the form of a butter dish;

Fig. 2 is a top plan view of the same;

Fig. 3 is a sectional detail view taken substantially on line 3—3 of Fig. 2; and Fig. 4 is a perspective view of the dish with the cover thereof removed.

The present receptacle, illustrated in the drawings, is in the form of a butter dish. It will, however, be seen from the following description that my invention may be utilized for maintaining a liquid cool, in which case the invention may find its form in the shape of a cup or drinking glass.

In the drawings, the form of my invention there illustrated, includes a tray 10 formed of any suitable material. This tray 10 includes a bottom portion 11 and upwardly and outwardly extending marginal wing portions 12. These wing portions 12 are formed integral with the bottom portion 11 and provide channels 13'. Beneath these channels the tray provides beads 13 forming a support for the tray to space the bottom 11 thereof from the objects upon which the dish is placed. Inwardly of these channels 13' there is provided a retaining ring 15 and that portion of the tray outwardly of and adjacent to this ring 15 provides a seat for a wall 19. This wall 19 is tubular in cross section to provide a chamber 20 for a liquid or the like. This wall 19 provides a substantially flat bottom 21 which rests upon the tray 10 when the wall 19 is mounted thereon, the ring 15 serving to properly retain the wall 19 on the bottom 11 and to prevent its accidental displacement therefrom. This wall 19 at bottom 11 provides an open compartment 14 in which the product, in the form of a block of butter, is placed.

To complete the invention there is provided a cover 18 having side walls 17 which extend into the channel 13'. This cover is retained in position over the compartment 14 by the upwardly extending wings 12. In order to fill the tubular wall with the liquid, there is provided a plugged opening 22.

The receptacle with the product confined in the compartment 14 and with the cover 18 in place, when not in use, is placed in any approved refrigerator. When the receptacle is removed from the refrigerator, the liquid, having a higher freezing point than the liquid contents of the butter, and above the normal temperature within the receptacle, will maintain the butter solid for a considerable period of time.

While I have illustrated the invention in the form of a butter receptacle, it is manifest that the invention may have other applications and, I therefore, do not want to be limited to the adoption of my invention in the form of a butter receptacle.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A receptacle for the purpose herein described comprising a tray having upwardly and outwardly extending marginal edges to provide a marginal rim extending around the tray and having a retaining ring spaced inwardly from the rim, a member substantially tubular in cross section mounted on said tray between the rim and the retaining ring and restrained from lateral displacement from said tray by said ring and providing together with the tray an open compartment, the bottom of said rim terminating in a groove extending around the tray, and a cover for said compartment including side walls, the corresponding edges of which fit into said groove when the cover is disposed in covering position with respect to said compartment.

LEO WOLF.

REFERENCES CITED

The following references are of record in the file of this patent:

UNITED STATES PATENTS

| Number | Name | Date |
|---|---|---|
| 1,150,583 | Elzas | Aug. 17, 1915 |
| 1,752,584 | Biette | Apr. 1, 1930 |
| 2,212,441 | Katz | Aug. 20, 1940 |